United States Patent [19]

Christian et al.

[11] 4,430,701

[45] Feb. 7, 1984

[54] METHOD AND APPARATUS FOR A HIERARCHICAL PAGING STORAGE SYSTEM

[75] Inventors: John H. Christian; Michael H. Hartung; Arthur H. Nolta; David G. Reed; Richard E. Rieck; Gerald E. Tayler, all of Pima County; John S. Williams, Tucson, all of Ariz.

[73] Assignee: International Business Machines Corporation, Armonk, N.Y.

[21] Appl. No.: 289,631

[22] Filed: Aug. 3, 1981

[51] Int. Cl.³ .......................................... G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,045,781 | 8/1977 | Levy et al. | 364/200 |
| 4,189,770 | 2/1980 | Gannon et al. | 364/200 |
| 4,190,885 | 2/1980 | Joyce et al. | 364/200 |
| 4,195,342 | 5/1980 | Joyce et al. | 364/200 |
| 4,208,716 | 6/1980 | Porter et al. | 364/200 |
| 4,322,815 | 3/1982 | Broughton | 364/900 |
| 4,323,968 | 4/1982 | Capozzi | 364/200 |
| 4,395,763 | 7/1983 | Takahashi | 364/900 |

*Primary Examiner*—Eddie P. Chan
*Attorney, Agent, or Firm*—H. F. Somermeyer

[57] ABSTRACT

A plurality of addressable data storage devices are selectively directly accessed or accessed via a cache memory. Access via the cache memory uses one of a plurality of logical addresses; each of the data storage devices is represented by a plurality of the logical addresses. Each of the data storage devices can be reserved for direct access; such reservation does not apply to device accesses via the cache. Accesses to the devices are queued on a device basis.

11 Claims, 12 Drawing Figures

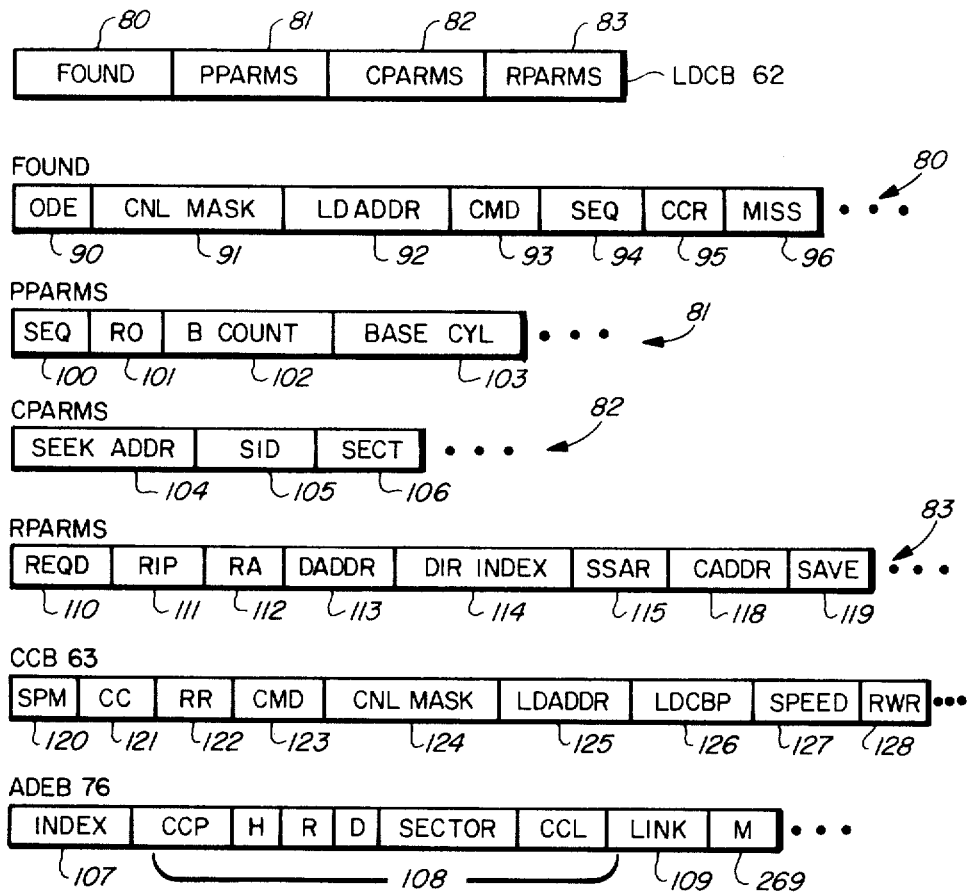
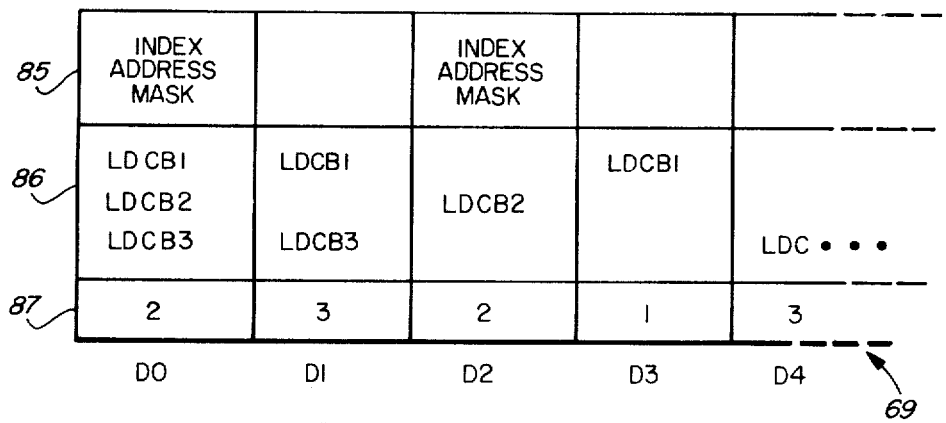
Fig. 3

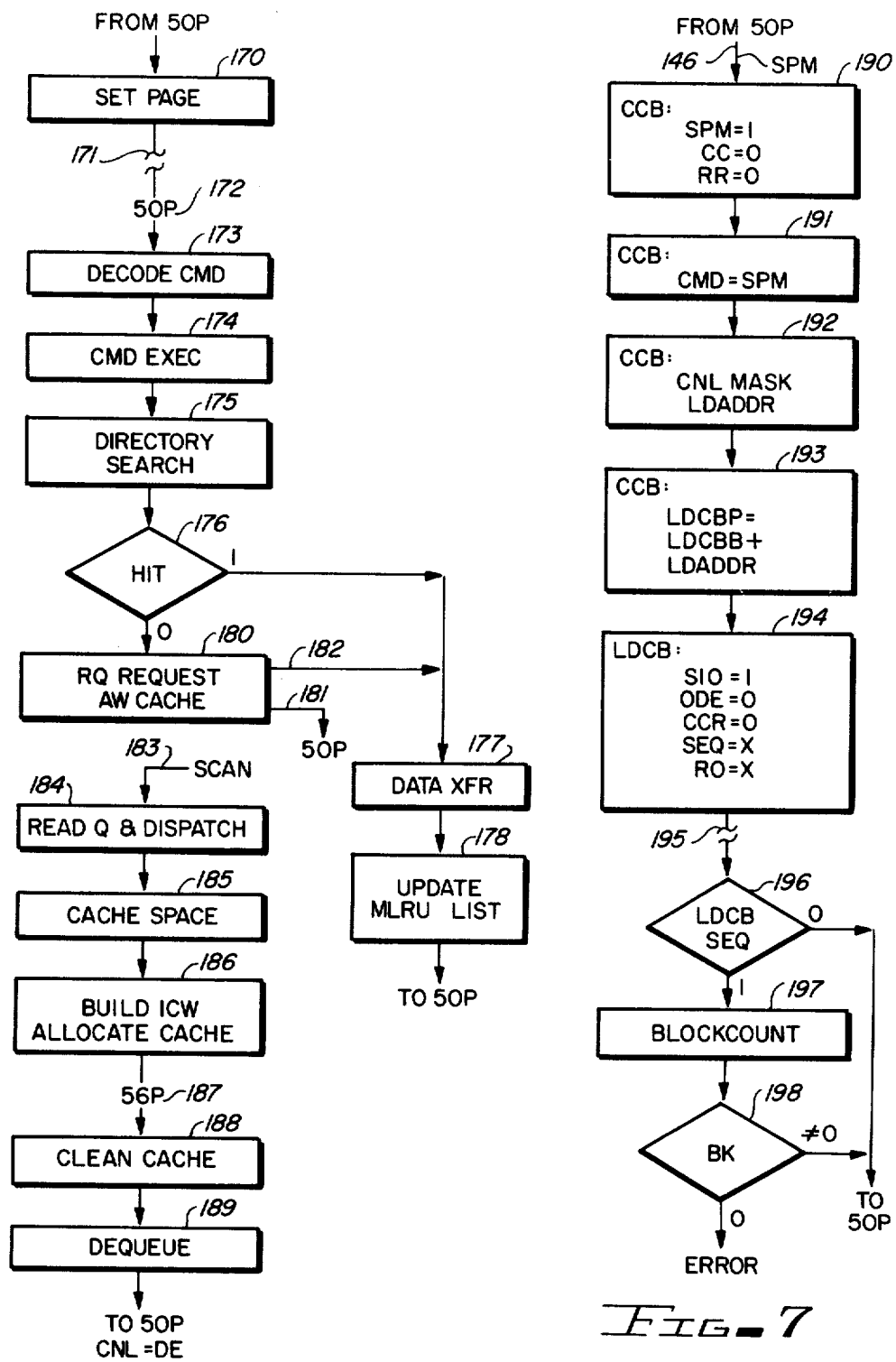

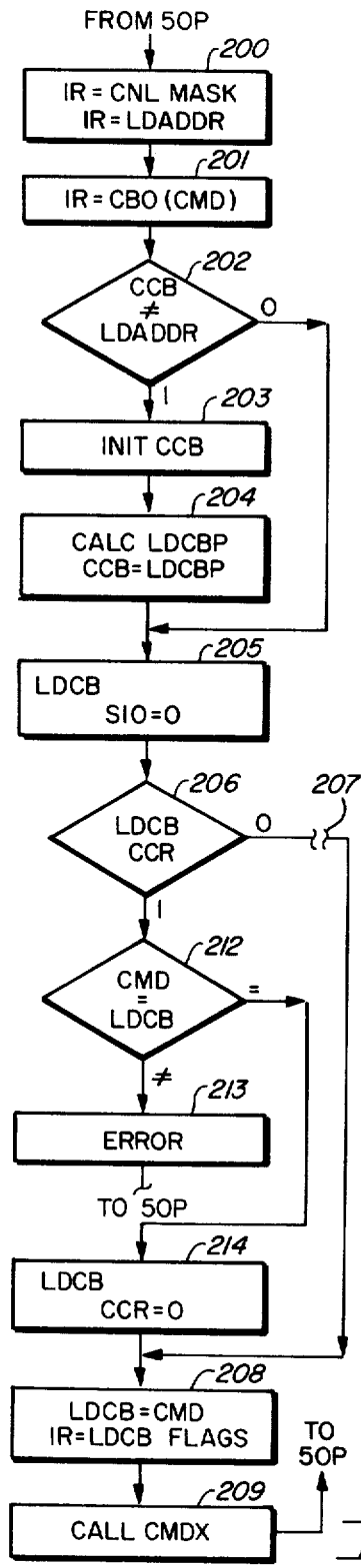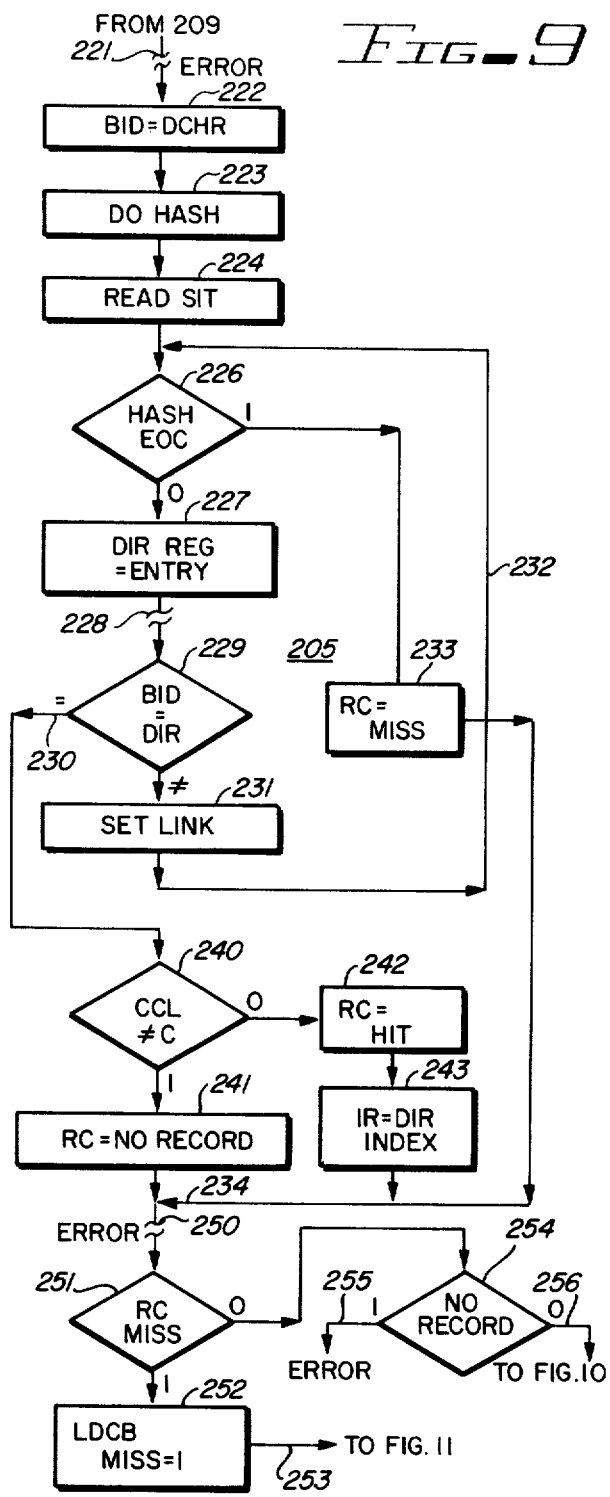
FIG-9
FIG-8

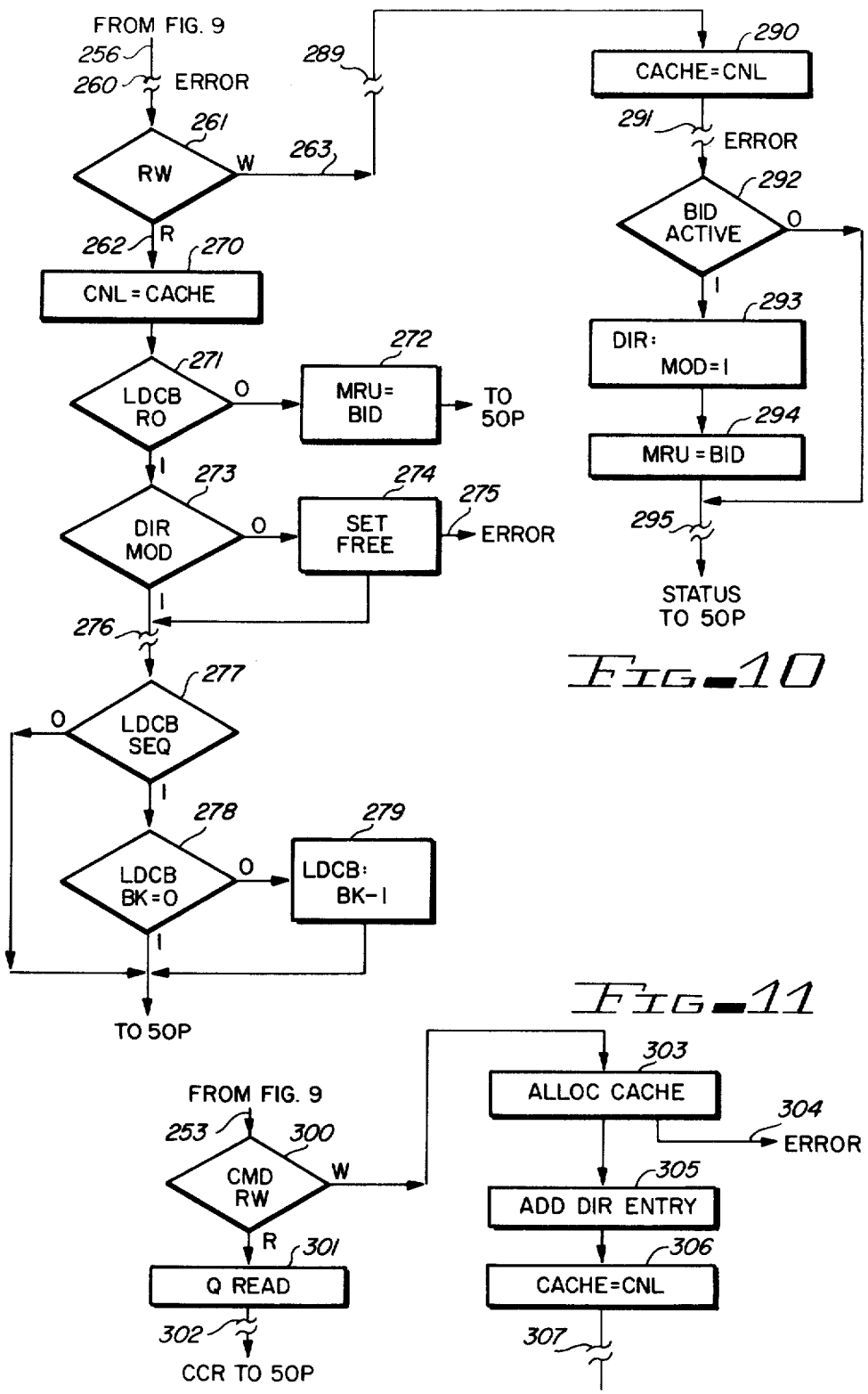

METHOD AND APPARATUS FOR A HIERARCHICAL PAGING STORAGE SYSTEM

BACKGROUND OF THE INVENTION

1. Field of the Invention

The present invention relates to paging storage systems employing a backing store such as a DASD (Direct Access Storage Device) and a front store, serving as a cache, and preferably consisting of a random access memory system.

2. Description of the Prior Art

Paging and swapping stores have taken several configurations, one of which involves using various direct access storage devices directly for storing paging and swapping data. The problem concerned with using such devices is the relatively long access time to stored paging and swapping data which has an adverse effect on the total central processing unit or data processing system performance; that is, such paging and swapping storage usually stores instructions to be executed by the central processing unit or data processing system. Accordingly, it is extremely important that such programs of instructions be promptly accessed for enhancing execution of such instructions. The IBM 2305 Fixed Head Storage Module described in publication GA-26-1589, available from International Business Machines Corporation, Armonk, N.Y., describes a storage drum for use in a paging and swapping environment. An advantage of the storage drum over and above the direct access storage devices is the relatively fast access to the paging and swapping instruction signals. A disadvantage is the relatively high cost for a given capacity of the storage drum. Accordingly, in many paging and swapping applications, a storage drum such as the IBM 2305 unit stores active pages of instruction data, while the relatively inactive instruction data is kept on direct access storage devices. Transferring the instruction data from the direct access storage device to the storage drum usually involves taking the units offline such that instruction execution time is not impacted. Accordingly, a hierarchical paging storage system which automatically transfers instruction data in the form of paging and swapping data sets between a front store, which has high speed accesses, and a backing store, having relatively large capacity and lower cost, hence a longer access, is desired. Further, multiple exposures to the data are to be provided; that is, more than one address should be usable to access a given unit of data. In this regard, the IBM 2305 unit supports multiple requesting in that addresses 0-7 cause access to a magnetic storage drum having a physical address of 0, while addresses in the group 8-15 select the drum module having a physical address 8. Each drum, of course, can honor only one access at a given time; therefore, a given access through one of the addresses for a given drum module will place all of the addresses to that given drum module in a so-called nonaccessible state. A greater flexibility in the multiple addressing area is highly desired for enhancing execution of programs of instructions stored and furnished in the form of paging and swapping data sets.

Hierarchical stores for diverse applications have been employed with diverse backing stores; for example, backing stores can be in the form of magnetic tape recorders, magnetic disk storage apparatus such as direct access storage devices (DASD), relatively slow random access memories, magnetic bubble or shift register type of memories, record library systems and the like. Front stores, which are designed to mask the relatively long access times to a backing store, have also taken diverse types of configurations. For example, in the IBM 3850 Mass Storage System, a backing store consisted of a magnetic tape library, while a front store consisted of a plurality of direct access storage devices. Here, the access to the direct access storage devices was relatively fast when compared with access to data in a data cartridge contained in the automatic tape library. Further, in the Eden U.S. Pat. No. 3,569,938, a hierarchical store is presented as being an apparent store to a using data processing system. A cache concept is shown in this patent wherein a relative high speed-access store acts as a buffer to a relatively slow access store. In this instance, a random access memory serves as a front store, or cache, while the backing store could be tape or disk storage apparatus. The size of the apparent store was the capacity of the backing store, while the access time gave an apparent access equal to the rapid access of the front store. A further hierarchical store is shown in Spencer, U.S. Pat. No. 3,839,704, wherein a direct access storage device is buffered by a random access memory which is accessible via a directory structure. A directory structure interprets the addresses for the backing direct access storage device and converts same to a buffer address through table lookup mechanisms well known in the data processing art. Again, the purpose of the Spencer arrangement was to mask a relatively long access time to the direct access storage unit. Further, Spencer provided for transferring data from the direct access storage devices to the buffer before the data processing system, connected to this hierarchical store, needed the data such that access time to the data was minimized. These two patents show general arrangements for caching various types of peripheral storage devices. Further controls are needed for satisfying modern day requirements of a paging and swapping storage system.

Another technological area in which caching enchanced performance is found in the main memory area of a computer or central processing unit. That is, each data processing system includes a central processing unit that has a cache or high-speed store. The backing store for this cache is the usual main memory. Various techniques have been used for enhancing the caching operation such that the central processing unit instruction execution as well as operand data transfers are maximized. An example of controlling the operation of the cache with respect to the central processing unit and a main memory is shown in Calle, et al., U.S. Pat. No. 4,075,686. This U.S. patent teaches that it is not always wise to use the cache—that, in some instances, performance can be enhanced by bypassing the cache. This is done in one of several ways—for example, the main memory is arranged in segments. Some of the segments may be dedicated for input/output or peripheral operations. All accesses to the segments will bypass the main memory cache. In a similar manner, the cache for a direct access storage device can be bypassed for selected devices or portions of devices under certain circumstances. In another aspect of Calle, performance enhancement can be achieved by selectively bypassing cache on a command basis. In this instance, the command to the main memory area will contain a cache bypass bit. When the bit is set to unity, the cache is not used and the main memory is directly accessed. If the cache bypass bit is reset to zero, then the cache is used.

While selectively bypassing cache can, in many instances, optimize performance of the storage system, such as the main memory cache system or a DASD cache system, further controls appear to be necessary for meeting the stringent requirements of modern day paging and swapping data transfers.

In hierarchical systems there are usually several replications of the same data; that is, the backing store will contain one copy while the cache, or front store, will contain a second copy. For data integrity purposes, either the cache or the backing store can be accessed at a given instant, but not both. This limitation is implicit in the references cited above.

In a paging and swapping environment, it is desired that plural accesses be provided for multitasking paging access while minimizing host controls over the storage system; that is, the paging and swapping storage system should have a good set of controls for maximizing the host or central processing unit operations while maintaining continuity of each independent operation for ensuring integrity of the paging and swapping environment.

DISCLOSURE OF THE INVENTION

In accordance with the invention, a paging and swapping storage system is of the hierarchical type having a front or cache, store and a backing store with means for transferring signals therebetween. Operation of such hierarchical storage in one aspect of the invention is that access to various portions of the backing store directly by a using central processing unit has the same access priorities as data transfers between the cache and backing store device. In a second aspect of the invention, each physical portion of the backing store can be reserved to a central processing unit via a so-called direct access mode; however, accesses via the cache to to such physical device reserve to the central processing unit ignore any reservation in the above-described direct access mode. The second method of accessing, for avoiding the reservation limitation, is called a paging mode. While not required for the other aspects of the invention, in a third aspect of the invention, there is provided completely independent and simultaneous access to the cache and backing store devices for given data that is stored in both the devices and the cache.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIG. 3 illustrates sets of control registers usable with FIGS. 1 and 2 illustrated system.

FIG. 6 illustrates a cache access control usable in the FIG. 1 embodiment.

FIG. 7 illustrates a set paging mode command logic flow of execution in the FIG. 1 illustrated system.

FIG. 8 illustrates a logic flow relating to the receipt of a command in the address and command evaluator of FIG. 1.

FIG. 9 illustrates a logic flow portion of the FIG. 1 illustrated cache access control relating to directory searching of the FIG. 1 cache access control.

FIG. 10 illustrates operations with respect to read or write commands of the FIG. 1 illustrated cache access control.

FIG. 11 shows a logic flow portion of the FIG. 1 cache access control relating to operations when access to a cache results in a so-called miss.

DETAILED DESCRIPTION

Figure 1:
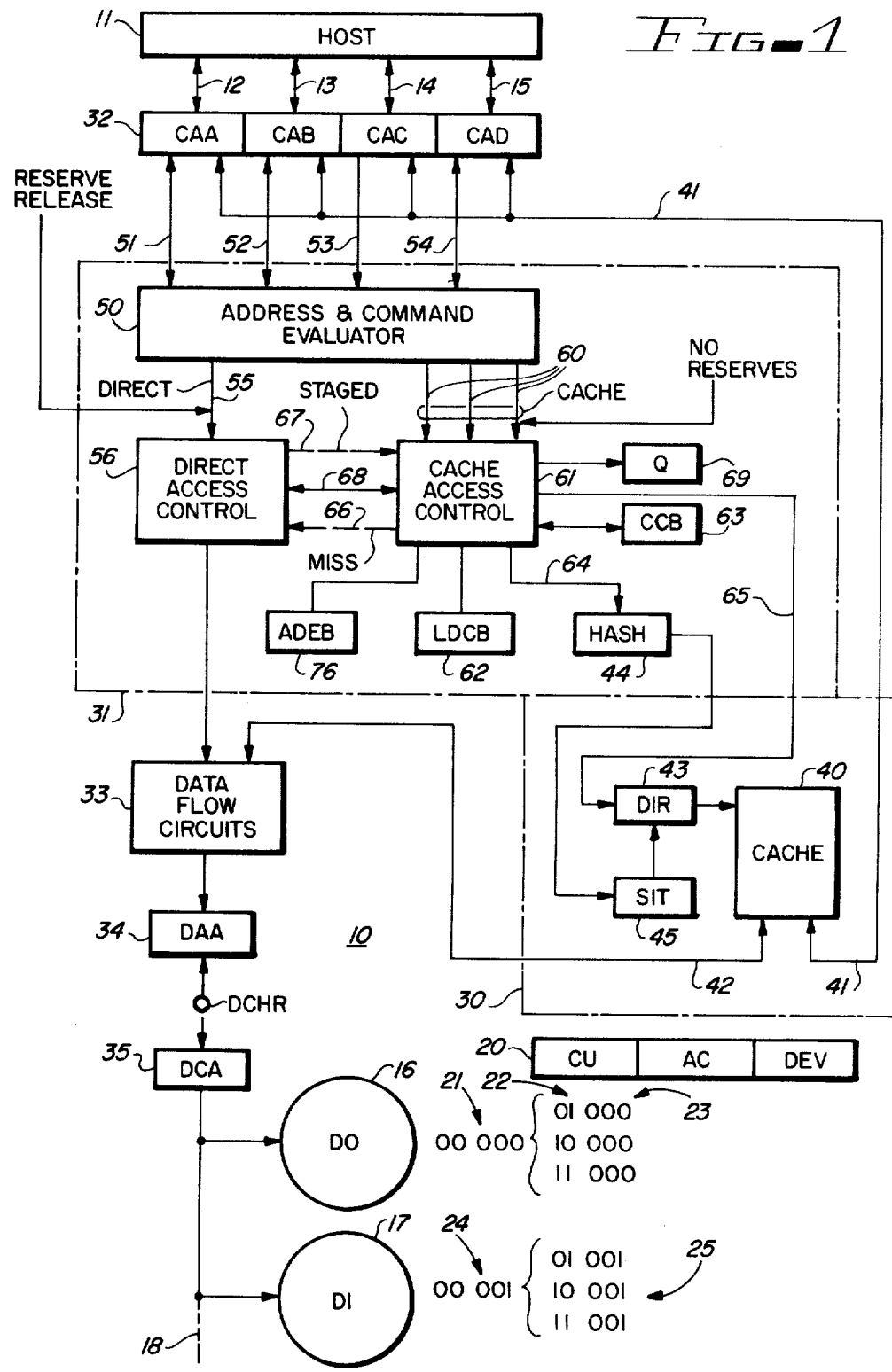
FIG. 1 is a logic diagram of a hierarchical paging and swapping storage system employing the principles of the present invention.
Figure 2:
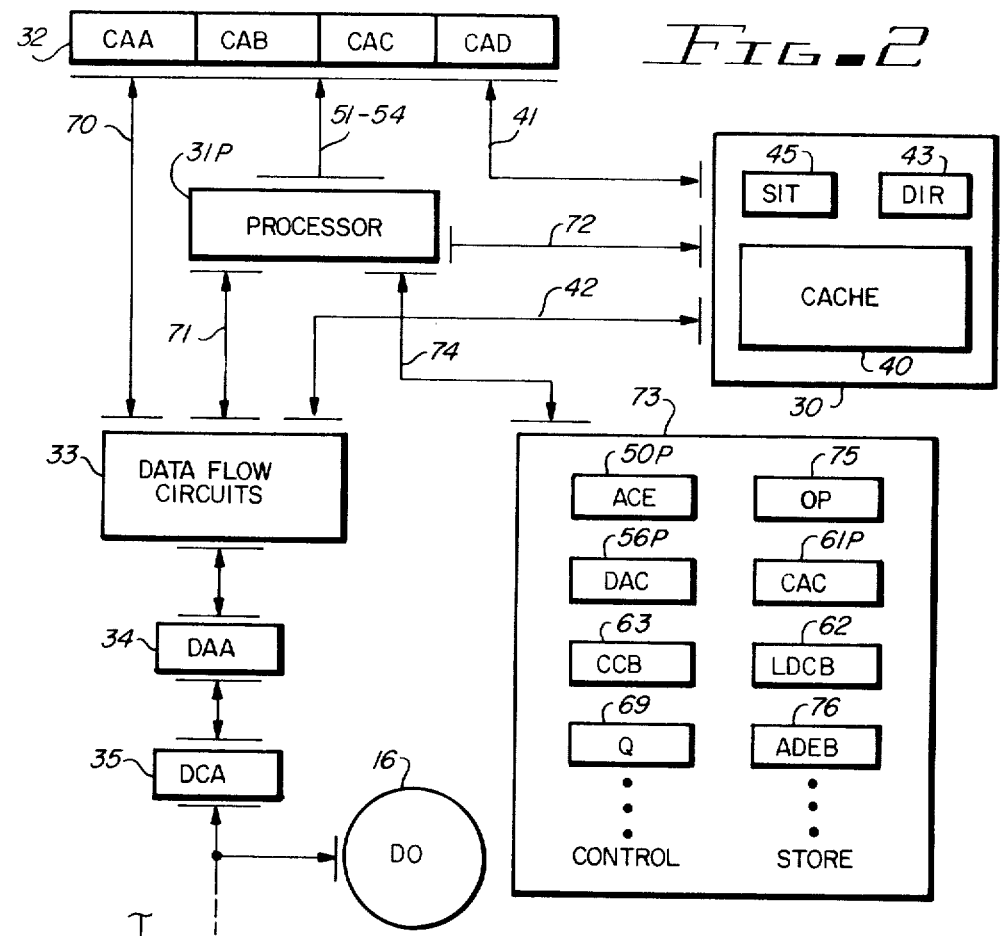
FIG. 2 shows a preferred implementation of the FIG. 1 illustrated system.

Referring now more particularly to the drawings, like numbers indicate like parts and features in the various diagrams. FIGS. 1 and 2 illustrate a peripheral system 10 employing the invention. FIG. 1 illustrates the system in a logic form, while FIG. 2 illustrates the system in an electronic circuit, or hardware, form. In FIG. 1, a single host 11 (the term host includes central processing unit, data processing system, a multiprocessing environment acting as a single unit and the like) communicates with the peripheral system 10 for paging and swapping data. A plurality of input/output connections 12, 13, 14, and 15 connect host 11 to peripheral system 10, which is a paging store. These input/output connections can be those used with IBM computers, as is well known. The paging and swapping data is stored in a backing store constituting a lower level of a two-level hierarchical store. The backing store consists of a plurality of DASD (direct access storage device) devices 16, 17 and further devices indicated by ellipsis 18. In the illustrated embodiment, a single so-called string of such DASDs 16-18 are shown. The operation is such that 4,096 byte blocks of data are rapidly transferred between host 11 and the DASDs 16-18 using the present invention. Each of the devices 16-18, having device addresses D0 for device 16, D1 for device 17, and D2-D7 for devices 18, are independently accessed via any of the input/output connections 12-15. That is, host 11 can address any of the devices 16-18 over any of the input/output connections. In addition to the multiple access paths, a plurality of access addresses for each of the devices 16-18 is provided. Such access addresses are in an address form indicated by numeral 20. The control unit, or peripheral system 10, address is indicated by portion CU which typically can be three bits. The actual or physical device 16-18 address is indicated in portion DEV, which for eight devices has three bits. Modifying the actual address of the devices 16-18 is an access, or exposure, address modifier AC, which in the present embodiment consists of two bits. The addressing of device D0 by the four accesses includes a direct access 21 in which the AC portion is all zeros and the device portion is also all zeros. Three additional accesses to device D0 are via a cache 40 and are identified by the bit patterns 22 consisting of 01, 10, and 11. The actual device address for all three accesses, as shown by bit patterns 23, remains the same. When host 11 accesses the data on device 16 using one of the four accesses, including access to the data via the cache 40, each of the accesses is treated as a separate logical device such that a plurality of independent input/output operations are performed with respect to device 16, one independent operation for each of the accesses. Depending upon the electronic circuit configuration of a particular peripheral system 10, device 16 can be accessed by the address 21 simultaneously and independently of the accessing cache 40 by one of the three indicated cache-related device access addresses. Address 21 can be provided by host 11 for any of the input/output connections 12–15, as can be any of logical device accesses. Device D1 is accessed directly by address 24 consisting of AC being 00 and the DEV portion being 001. The logical device, or cache, accesses 25 are similarly patterned as described for logical device accesses 22, 23 for device 16. The other devices D2–D7 are similarly addressed.

The front store, or upper level, of the paging store hierarchy of peripheral system 10 includes a system storage 30, which is operationally accessed and controlled by control 31. Signal transfers between system storage 30, control 31 and host 11 are via a plurality of channel adapters 32, which are individually denominated CAA, CAB, CAC, and CAD. These channel adapters are those attachment circuits found in control units attaching to IBM computers via the input/output interconnections 12–15. Signal transfers between devices 16–18 and system storage 30, control 31 are via a set of data flow circuits 33, which convert the usual digital signals found in data processing systems to a serial format and protocol usable with disk storage apparatus, such as is well known in the art. Data flow circuits 33 in turn transfer signals through device adapter 34, also denominated DAA, then through disk controlling adapter 35, also denominated DCA. Devices 16–18 are addressed by an address DCHR wherein the D corresponds to the device address DEV, C indicates the cylinder address, H indicates the head address, and R indicates the record number. The record can be rapidly located by rotational position on the disk storage apparatus, as is well known. System storage 30 has three major portions: the first and larger portion 40 is a cache for storing paging data to be rapidly accessed by host 11, and for storing paging data to be written to devices 16–18 such that host 11 need not wait for the devices 16–18 to accept such data. The principles of caching devices 16–18 are shown in the prior art references discussed in the background of the invention. Access to the caching data stored in cache 40 is via a directory 43, which consists of a plurality of registers which contain signals identifying the address of devices 16–18 (DCHR), the address of registers in cache 40 where the data is stored and other control information, as will be described later with respect to FIG. 3. Since cache 40 is relatively large, i.e., several megabytes, access to the cache 40 is enhanced by employing a so-called hashing technique implemented in hash circuit 44. Hashing addresses is well known, and the method of hashing is not pertinent to an understanding of the present invention and hence is not further described. The output of the hash circuit 44 addresses a scatter index table 45, also denominated SIT, which indexes the hashed address to directory 43 for addressing the directory 43 for accessing cache 40. In each hash output, one or more directory entries may be involved. A plurality of entires relating to a given hash output is called a hash class and is linked together using a singly or doubly-linked list such that a single access to directory 43 may result in a complete scan of cache 40 for a given device 16–18 range of addresses. Cache 40 transfers signals with channel adapters 32 over an internal bus 41 and with data flow circuits 33 over an internal bus 42. The transfer of such data signals between the random access memory used for system storage 30 and other devices 16–18 is well known and not further described for that reason.

Control 31 has three major portions. The first portion, address and command evaluator (ACE) 50, connects to channel adapters 32 via the respective bus connections 51, 52, 53, and 54. ACE 50 receives various input/output commands from host 11 via the channel adapters 32, partially decodes same, and determines whether the address provided with a command from host 11 is a direct access or a logical access as explained earlier with respect to the addressing scheme for devices 16–18. When a direct access is indicated by an address 21, 24, etc., communications from ACE 50 proceed to direct access control 56 (DAC 56). DAC 56 is constructed using the techniques for control units which couple direct access storage devices 16–18 to host 11; such access controls are well known and not detailed with respect to such direct access. A portion of DAC 56 is described as it relates to practicing the present invention. Operation of host 11 through DAC 56 to devices 16–18 includes the ability to reserve the devices 16–18 to host 11 via any one of the channel adapters 32. This means that access to the reserved device is limited through a specific channel adapter 32. The principles of reserve and release as practiced with IBM computers are well known and are not further described for that reason.

ACE 50, in receiving the commands with associated addresses from host 11, can detect one of the three logical accesses, such as indicated by numerals 22, 23, or 25. In this instance, ACE 50 communicates with cache access control CAC 61 via one of the paths 60 for accessing cache 40 to lodge paging data into cache 40 or to retrieve paging data from cache 40. When a logical access is specified with the command from host 11, devices 16–18 cannot be reserved; that is, if device D0 is reserved to channel adapter CAA for access by host 11, host 11 can send an independent request for data over path 14 through CAC 61 to peripheral system 10. In the event the requested data is not in cache 40, CAC 61 via path 66 accesses device D0 through DAC 56, even though device D0 is reserved for accessing to channel adapter CAA. In this manner, paging data can be transferred to cache 40 and relayed to host 11. In this manner, the devices 16–18 are reserved for certain data processing operations but are completely left open for access for paging data operations.

CAC 61 operates with a plurality of status-indicating registers. For example, LDCB (logical device control block) registers 62, as later explained with respect to FIG. 3, contain control information signals relating to the logical device accesses via cache 40 such that each requested access to a device 16–18 is independently handled by peripheral system 10. The transfer of data signals via bus 41 between cache 40 and channel adapters 32 is indicated by signals stored in a set of registers termed channel control block (CCB) 63. Access to cache 40 is by requesting a hash operation via bus 64 to hash circuits 44. Once circuits 44 identify the correct entry in directory 43, the entry is transferred from system storage 30 to a set of registers ADEB (active directory entry buffer) 76 such that CAC 61 can operate with cache 40 without referring further to system storage 30 to obtain such control information. If the directory 43 indicates that data requested through a logical access is not in cache 40, i.e., there is no directory entry, then the requested data must be transferred from a device 16–18 to cache 40 for relaying to host 11. This is achieved in a highly asynchronous manner by queuing such device read requests in a set of queue registers 69, and as later described with respect to FIG. 3. In certain instances, CAC 61 will have prior address information such that directory 43 can be accessed without resorting to hash circuits 44 or SIT 45. This access is indicated by bus 65 directly accessing directory 43. CAC 61, in handling a miss of data in a cache 40 request, accesses devices 16–18 via path 66. Further communications are indicated by double headed arrow 88. When DAC 56 has transferred the data signals from devices 16–18 to cache 40 via bus 42 (which may be combined with bus 41 when simultaneous transfers to and from cache 40 are not implemented), DAC 56 notifies CAC 61 via path 67 that paging data has been staged or promoted to cache 40. Then CAC 61 supplies an appropriate indicating signal to host 11 such that host 11 can then rerequest the data from peripheral system 10 such that it will be promptly relayed to the host 11 from cache 40. Such procedures are known in the prior art and have been referred to as channel command retry when used in connection with IBM data processing systems.

The input/output commands supplied by host 11 to peripheral system 10 are those used in connection with operating disk storage apparatus systems. Other commands for the logical accesses include set paging mode parameters which prime CAC 61 as will be described. The address structure 20 for the multiple accesses is similar to the address structure for those disk storage apparatus using only direct access addresses. Accordingly, in practicing the present invention, minimal changes are required in the input/output arrangements with a host 11 over and above the usual direct access storage device system as employed through DAC 56. It should also be noted that the operation of cache 40 with respect to DASDs 16–18 and host 11 provides enhanced and simultaneous accesses for achieving an apparent store through caching principles; it has high performance, yet large capacity.

FIG. 2 illustrates a preferred implementation of the FIG. 1 illustrated arrangement. Control 31 is implemented in a computerized form, which includes a digital processor 31P which communicates directly with channel adapters 32 via bus connections 51–54. Data flow between the host 11 and DASD devices 16–18 is via a bus 70 extending directly from channel adapters 32 to data flow circuits 33. Channel adapters 32 have known switching circuits for switching to and from bus 70, as is practiced in most present day control units. Processor 31P controls data flow circuits 33 via bus 71, as is well known and not further described for that reason. Processor 31P communicates with system storage 30 via bus 72. Bus 72 typically will carry address signals, read command signals, write command signals and the like to system storage 30. Processor 31P is controlled by a set of so-called microcode programs stored in control store 73. Processor 31P fetches the microcode programs via bus 74 to enable processor 31P to perform all of the control functions described for control 31. For example, address and command evaluator 50 has its functions performed by processor 31P executing programs ACE 50P. In a similar manner, direct access control 56 has its functions performed by processor 31P executing programs DAC 56P. In a similar manner, cache access control 61 corresponds to programs CAC 61P. Of course, operating a storage system requires many other programs for diagnostic purposes and the like indicated by OP (other programs) 75. Control store 73 also contains the addressable registers LDCB 62, ADEB 76, the queuing registers 69, CCB 63 and, may contain SIT 45 as well as other registers not pertinent to the present invention but which processor 31P may use for operating storage peripheral system 10. For example, hash circuits 44 can have their functions performed by OP 75. Communication with SIT 45 of system storage 30 (or in control store 73, as the case may be) from OP 75, of course, is through processor 31P executing the programs and sending appropriate output control signals over bus 72 to system storage 30; when SIT 45 is in control store 73 operations are speeded up. In all other regards, the operation of peripheral system 10 is the same in both FIG. 1 and FIG. 2 illustrations.

Before continuing with the detailed description of the operation of the present invention as embodied in the FIGS. 1 and 2 illustrated storage system, the registers for containing control data necessary to a successful practice of the invention in the illustrated embodiment are described with respect to FIG. 3. LDCB 62 contains control data for processor 31P to successfully process all peripheral system 10 actions with respect to each of the logical devices represented by the addresses with respect to address structure 20. Accordingly, there are three logical device control blocks for each of the devices 16–18. In an eight-device peripheral system 10, there would be 24 logical device control blocks. The direct access to devices 16–18 handled through DAC 56 does not require a logical device control block, since the DAC 56 handles the accessing as in prior art disk storage apparatus systems.

LDCB 62 is best understood by arranging the control data into four major portions. A first portion, foundation 80, relates to that control data describing the basic architectural functions of the illustrated embodiment. In the second portion PPARMs 81 (paging parameters) contain control data relating to the set paging mode parameters command received from host 11. In the third portion CPARMs 82 (command parameters) contain control data relating to set sector, seek and search ID commands received from host 11. In the fourth portion, RPARMs 83 (read parameters) relate to those control data for accessing devices 16–18 for the purpose of transferring data signals to cache 40.

Foundation portion 80, insofar as the practice of the present invention is concerned, includes the following control data fields. ODE 90 is a single bit indicating a device end (DE) is owed to the host with respect to the logical device associated with the present LDCB. Channel mask (CNLMASK) 91 indicates which of the channel adapters 32, hence which of the channels, of host 11 have activated the logical device for accessing data from an identified device 16–18 via cache 40. The logical device address 92 (LDADDR) identifies which of the logical device addresses is associated with the LDCB. For example, a device 16 LDADDR 92 would contain the bit pattern 01000 for a first of the three logical devices based upon device 16. As a practical matter, the addressing of the LDCBs is by logical device address used as an offset from a base address. The LDADDR section 92 constitutes a verifying and seek identifying function of LDCB 62. Any command that was received from host 11 that is currently active in the peripheral system 10 for the identified logical device is stored in CMD 93. SEQ 94 is a single bit identifying whether or not sequential access has been indicated by host 11. This bit being active indicates that the host 11 will read a succession of paging blocks of data, primarily in a predetermined sequence. CCR 95 is a bit indicating that a channel command retry (CCR) is in progress, i.e., has been sent to host 11. Channel command retries are part of the known IBM input/output system operations and are used when a cache 40 miss occurs. MISS bit 96 indicates that a scan of DIR 43 indicated a MISS condition, i.e., no desired data was in cache 40 or no space is allocated in cache 40 for data to be written by host 11. Other control fields, of course, would be found in this area, but those are not pertinent to the present invention.

PPARMs 81 include SEQ 100 for indicating that a number of contiguous block addresses will be referenced by host 11. SEQ 100 contains the same information as SEQ 94. RO 101 indicates that any paging blocks transferred from cache 40 through channel adapter 32 to host 11 as a result of a read command from host 11 may be invalidated following the data transfer. B COUNT 102 indicates the current number of paging blocks yet to be processed. BASE CYL 103 indicates the base cylinder address received during execution of a set mode paging parameters command. Other fields not pertinent to the present invention would also be included in PPARMs 81.

CPARMs 82 contain the SEEK ADDR 104 which contains the address of device 16–18 together with its cylinder and track addresses for performing a disk storage apparatus seek, as is well known. SID 105 contains the search identification argument. SECT 106 contains the current set sector value, i.e., the rotational position of disk storage apparatus for accessing a paging block.

RPARMs 83 include REQD 110 for indicating that access to a device 16–18 is required to satisfy a host request, i.e., data has to be transferred from device 16–18 to cache 40 for relaying to host 11. RIP 111 indicates that a current transfer from a device 16–18 to cache 40 is in progress. RA 112 indicates that some post-processing for the device 16–18 transfer to cache 40 is in progress. Other control flags for indicating status of the relationship between devices 16–18 and cache 40 can also be included in the RPARMs 83. DADDR 113 contains the address of the device 16–18 involved with the read operation. DIR INDEX 114 is an index to directory 43 which is used for calculating the address of the corresponding entry in the directory indicated by DADDR 113 and the corresponding cylinder head and record identification. SSAR 115 contains the identity of the storage address register of system storage 30 which will be used in connection with reading a paging block from device 16 to system storage 30. In this regard, system storage 30 has a plurality (8 or 16) of address registers which are addressable for facilitating more rapid data transfers between the host 11 and cache 40, as well as between devices 16–18 and cache 40. CADDR 118 contains a current address of the cache block for transferring signals between cache 40 and devices 16–18. SAVE 119 is a temporary save area for parameters for disconnected operations as is practiced in the usual manner in data processing, particularly in the control of peripheral devices.

CCB 63 includes SPM bit 120, which signifies whether or not a set paging mode parameters command has been received. The set paging mode parameters command enables access to system storage 30 for operation in a paging mode. CC bit 121 indicates that command chaining has been set up by host 11. Command chaining is that operation tying a set of commands together, as is widely practiced in the data processing art. RR bit 122 indicates a read retry is active in system storage 30. For example, an error condition can occur; recovery from that error condition may require a read retry. Details of the retry are not shown in the present description. CMD 123 contains the current or last command received from host 11 which is currently being handled in peripheral system 10. CNL MASK 124 identifies which channel adapter 32 conveyed the CMD 123 contents to control 31. LDADDR 125 contains the address of a logical device currently selected by host 11. LDCBP 126 is a pointer or address value pointing to the LDCB 62 associated with the current logical device. SPEED 127 indicates the data rate of a connected channel. RWR 128 relates to overrun counts before retry is avoided; since thresholds for retries are well known, such action is not described in the present application. CCB 63 may contain additional control bits and fields as design practices dictate.

ADEB 76 contains one entry of DIR 43. Accordingly, the description of ADEB 76 will also describe DIR 43. INDEX 107 is the logical address of the active directory entry. This field provides self-identifying data in each entry. INDEX 107 contains the same information as contained in DIR INDEX 114 of RPARMs 83. Section 108 contains the address of the device 16–18 which contains the data which may be replicated in cache 40 or is to be replicated in cache 40. CCP indicates the cylinder address of the physical device while CCL indicates the logical cylinder address of the device. H indicates the head address, i.e., which surface of the device 16 is to be accessed, D is device address, R is the record number and SECTOR contains the sector address, i.e., rotational position. D corresponds to DADDR 113. From the above, it can be seen that LDCB 62 provides all of the controls for the logical devices, while DIR 43 and ADEB 76 contain the controls for the devices 16–18 independent of the logical device. That is, operation of peripheral system 10 between the devices 16–18 and system storage 30 is the same for all logical devices. Control 31 provides the separation and continuity of logical devices which exist between host 11 and system storage 30 for providing multiple accesses to disk storage apparatus 16–18. LINK 109 of ADEB 76 links the entries of DIR 43 of each hash class. In other words, hash 44 via SIT 45 accesses a first entry of DIR 43. If that entry is a non-compare, then link 109 is used to fetch a second entry from DIR 43 which is in the same hash class and therefore identified by the SIT 45 indication for DIR 43. At the end of the hash class, link 109 is all zeros to indicate end of hash or chain of DIR 43 entries. If all zeros are encountered in SIT 45, a miss has occurred. Of course, DIR 43 and ADEB 76 can contain additional fields for each entry, but these are not pertinent to the present invention.

Operations between system storage 30 and devices 16–18 are asynchronous and substantially independent of operations between host 11 and devices 16–18, as well as of the operations between host 11 and system storage 30. To achieve this, a set of read queues and write queues is established in a set of registers queue 69. Queue 69 includes write queue 85, which has a separate queue for each of the devices labeled D0–D4 . . . . Each write queue register contains the index corresponding to INDEX 107 of ADEB 76 and DIR 43. The queue also stores the address necessary for accessing the devices 16–18 which includes a seek argument, search argument, sector, device mask and the address portion for accessing cache 40, such as the cache block address and the SSAR (not shown) for addressing system storage 30. A link field can be included to contain a pointer to a next entry in the write queue 85 for the given device or for pointing to the next device write operation, i.e., which page in cache 40 is to be next written to a device 16–18. Accordingly, write queue 85 can contain one or a plurality of references to cache 40 for accessing paging blocks to be written to a given device 16–18.

Queue 69 also includes read queues, each of which includes portions 86 and 87 which constitute a round-robin queue. Portion 86 contains the LDCB 62 addresses for identifying which logical devices require data transfers from a device 16–18 to cache 40. Portion 87 indicates a pointer to one of three possible entries in each queue for indicating which logical device is to be next serviced. For example, D0 portion 87 contains numeral 2 indicating that LDCB 2 is to be next serviced; following LDCB 2 then LDCB 3 will be serviced, then 1. D0 has a full read queue for all logical devices associated with device 16. Device D1, corresponding to device 17, has two entries. In this read queue are LDCB1 and LDCB3 with the pointer number 3 in portion 87 indicating that LDCB3 is to be next serviced. Accessing the read queue 86–87 enables processor 31P to access the correct LDCB 62 for transferring data from a device 16–18 to cache 40 in an appropriate sequence relative to the sequence that the data was requested by host 11. The device read queues are scanned in the round-robin fashion in the same manner that the LDCB addresses of portion 86 are scanned, i.e., round-robin. Other forms of priority determination may be used while practicing the present invention. In addition to the registers shown in FIG. 3, other registers may be employed in constructing a peripheral system 10; those registers are not necessary to the understanding of how to practice the present invention in the illustrated environment.

Figure 4:
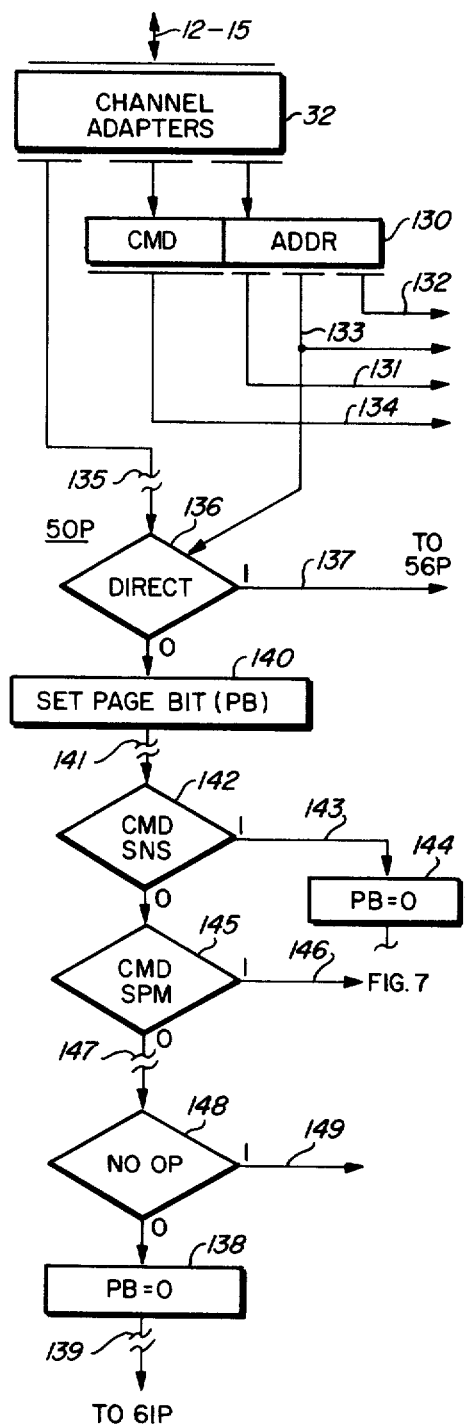
FIG. 4 is a combined logic and flow diagram showing the address and command evaluator of FIG. 1.

FIG. 4 is an abbreviated showing of ACE 50P, together with the connection to channel adaptors 32, illustrating how the present invention is practiced with respect to that portion of control 31. It is to be appreciated that other commands and functions are performed in ACE 50P which are not pertinent to an understanding of the present invention. Commands from host 11 are supplied over an I/O connection 12–15 to channel adapters 32 which provide usual command preprocessing, including supplying a command code permutation and a logical device code permutation to register 130. Bus 131 carries a portion of the address in register 130 identifying the control unit CU as explained with respect to FIG. 1. Bus 132 carries the device 16–18 address, i.e., address 23 of the total address field as DEV of address structure 20. Bus 133 carries the code permutation AC (address structure 20, FIG. 1) identifying whether or not direct access to devices 16–18 is being implemented or which of the logical devices is currently being addressed. Bus 134 carries a code permutation for the received command to control 31. In addition, channel adapters 32 provide interruption signals to processor 31P for activating microcode program ACE 50P. When activated by a channel adapter 32 interruption signal, processor 31P performs certain nonpertinent functions at 135 preparatory to processing the received command as it pertains to the present invention. At 136, the address portion AC is analyzed to determine whether or not direct access to devices 16–18 is desired or whether access to the devices will be via cache 40. For a direct mode access, logical path 137 is followed by processor 31P to DAC 56P. When DAC 56P is activated it is appreciated that the addressed device 16–18 becomes busy and is not available for transfer of data signals with cache 40. When the direct mode is not indicated at 136, then the paging mode, i.e., access to device 16–18 data via cache 40, is indicated. At logic step 140, a page bit (PB) of an internal register in processor 31P is set to the active condition. This bit is used only by ACE 50P for remembering that it is processing a command in a paging mode. Upon completion of ACE 50P operation, PB is erased. For this reason, the bit position of an internal register is not shown. Following step 140, some nonpertinent logic steps are performed at 141. At 142, whether or not the received command is a SENSE command (host 11 has requested so-called SENSE, or status, information from peripheral system 10) for the addressed logical device is determined. For a SENSE command, logical path 143 is followed to step 144 wherein PB is reset to zero, i.e., status information will be supplied to host 11 and further paging functions are not performed.

From step 142, for a non-SENSE type command, logic step 145 is performed. Preparatory to performing step 145, error check conditions are verified as being nonexistent, and certain internal housekeeping functions not necessary to the practice of the present invention, such as address setting and the like, are performed. Then, in step 145, ACE 50P detects the command set paging mode (SPM). For a detected set paging mode command, logic path 146 is followed to the steps set forth in FIG. 7. Otherwise some other nonpertinent functions are performed at 147, followed by detection of a no-op (no operation) command 148. For a no-op command, logic path 149 is followed to functions not further described. At 138, PB is reset to zero, which is followed by some nonpertinent functions at 139. Then, CAC 61P is activated as shown in FIG. 5.

Figure 5:
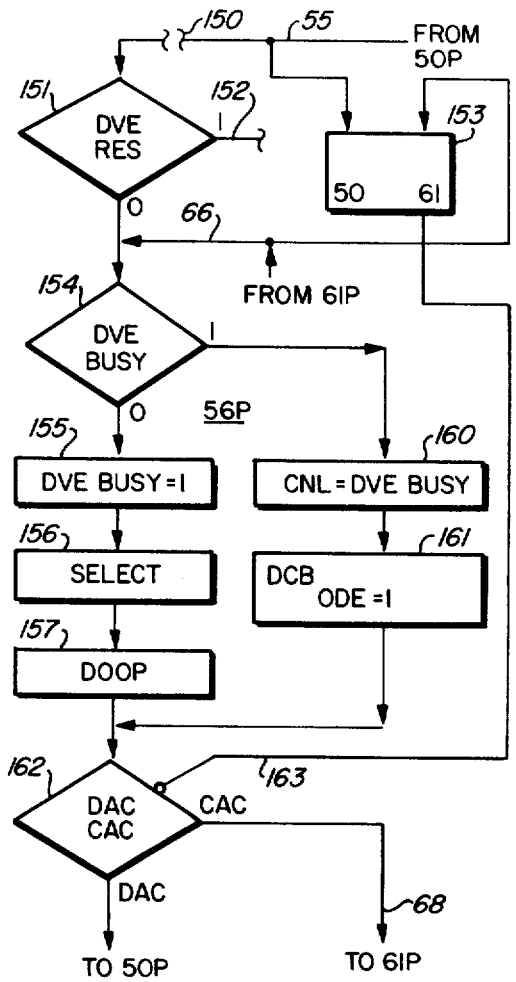
FIG. 5 is a logic flow diagram illustrating the direct access control of FIG. 1.

FIG. 5 illustrates the logic steps of DAC 56P necessary for an understanding of the present invention. Activation of 56P can be either from ACE 50P or CAC 61P. For direct access to devices 16–18, entry at 55 (see FIG. 1) from ACE 50 results in some nonpertinent functions performed at 150. Also, flip-flop 153 (internal to processor 31P) is set to the conditions for indicating direct access mode (50). Following steps 150, at 151 processor 31P determines whether or not the addressed device is reserved to a channel adapter 32 other than the channel adapter which received the command. If this is the case, logic path 152 leads processor 31P to the usual reserve violation code which indicates a busy status to the requesting channel adapter 32. If the device is not reserved to another channel adapter, then processing continues within DAC 56P.

Requested access to a device 16–18 through DAC 56P can also occur from CAC 61P via logic path 66. Such a request results in flip-flop 153 being set at 61 for indicating that paging access is being made to a device 16–18. Since the request from CAC 61P comes over logic path 66 subsequent to the reserved evaluation step 151, device reserve has no effect on paging access to devices 16–18. From either step 151 or path 66, logic step 154 checks to see whether or not the device 16–18 addressed either by host 11 or by CAC 61P is busy, i.e., currently performing a data processing function or a free-standing function, such as seeking a track. If the device is not busy, a device busy flip-flop (not shown) is set active at 155. Such flip-flop can be sensed by channel adapter 32 as well as by processor 31P to see if the device is busy. At 156, the addressed device 16–18 is selected using known device selection techniques for control units. At 157, the operation is performed. That is, if the command from the control unit to the device is to seek a cylinder, then step 157 results in transferring the seek cylinder command together with the target cylinder address to the addressed device 16–18; for read command a read would be instituted with the signals being transferred from device 16–18 to host 11 over bus 70 (FIG. 2) or to cache 40 over bus 42.

On the other hand, if the addressed device is busy, then at 160 a device busy indication will be transferred to the requesting channel adapter 32 or to CAC 61P. A device control block DCB (not shown) contains control data for operating with devices and has an owed device end flag set to unity at 161. For CAC 61P attempted access to devices 16–18, ODE 90 of the LDCB 62 (FIG. 3) is set to the active condition. At 162, the processor 31P determines whether the operation just performed is for a direct access or for a paging access. Flip-flop 153 supplies this indicating signal over line 163 such that when flip-flop 153 is in the 61 state, logic path 68 to 61P is followed, while in the direct access mode (the 50 state) return to ACE 50P for reporting the status and terminating operations with the channel adapter 32 is instituted. Such status and terminating operations are those usually performed in connection with IBM computers and therefore are not further described.

FIG. 6 illustrates overall logic flow of system 10 operation. From ACE 50P, the paging mode is set at 170 as described later with respect to FIG. 7. Certain non-pertinent functions are performed at 171, and the completion of the paging mode being set is reported through ACE 50P at 172. Then host 11 will send another command which is decoded at 173. Command execution is initiated at 174. A search of directory 43 is made at 175 to see if storage space in cache 40 has been properly allocated to the requested paging block. For a hit at 176, data transfer, either read to host 11 or write from host 11, is performed at 177. The addressed cache 40 area for the data transfer is then indicated as most recently used in the MLRU list updating step 178. Then processor 31P returns to ACE 50P for reporting completion of the command. For a miss, a read request is made at 180 and a CCR (channel command retry) is sent to host 11 via ACE 50P at 181. For a write command, a segment of cache 40 is allocated and then, following logic path 182, data transfer 177 is performed. Note that a write to cache does not delay execution of a command except for an insignficant time required to allocate the space in cache 40. It is understood that steps 173 through 180 can be performed several times during each chain of command but that the paging mode is set only once per chain of command.

Asynchronous data transfers from device 16–18 to cache 40 require activation by processor 31P performing a well-known scan for work. Following logic path 183, queue 69 is examined at 184. When the queue indicates a data transfer is to ensue, that job is then dispatched. Cache space is allocated at 185 and internal command word (ICW) is built at 186. An ICW is similar to a CCW received from host 11 through a channel adapter 32. Hence, the operation of the asynchronous data transfer between cache 40 and device 16–18 is performed through DAC 56P. This means that the asynchronous operation is on the same level as the direct access operation, i.e., has the same priority as opposed to giving priority to the direct access request from host 11. The processing is turned over to DAC 56P at 187 for automatic transfer of data from a device 16–18 to cache 40. Upon completion of that transfer, processor 31P at 188 performs housekeeping functions for updating directory 43 and the like. At 189, the work is dequeued from queue 69. For a read operation a device end is sent to host 11 via ACE 50P. The set paging mode command from host 11 indicates to peripheral system 10 that, in the subsequent chain of commands, cache 40 will be used to access a device 16–18 via one of the three logical addresses. As shown in FIG. 7, activation of set paging mode logic steps is via logic path 146. At step 190, CCB 63 is accessed for setting SPM 120 to unity, CC 121 to 0, and RR 122 to 0. This initializes CCB 63 for execution of the set paging mode command. Then at 191, CCB 63 is again accessed for setting CMD 123 equal to the code permutation representing SPM. At 192, CCB 63 is again accessed for transferring a channel mask to CNLMASK register 130 (FIG. 4). Then at 193, the LDCB 62 pointer is generated and transferred to LDCBP 126 of CCB 63. The LDCB 62 pointer consists of the base address of the LDCBs (LDCBB) as modified by the logical device address. Then, in LDCB 62 corresponding to the pointer generated in step 193, logic step 194 indicates that an SIO (start input/output) has been received (this is not shown in foundation portion 80), ODE 90 is reset to zero, CCR 95 is reset to zero, and SEQ 94 is set to the value received in the set paging mode command, that is, whether or not a sequential operation is to be performed as indicated in the set paging mode command. In a similar manner, read and discard, a paging parameter which is selected by the set paging mode command is inserted into RO 101 of PPARMs 81. Some nonpertinent logic steps are performed at 195 by processor 31P; then at 196, LDCB 62 is examined at the logical address for determining whether or not sequential bit SEQ 94 has been set to the active condition. If not, ACE 50P is returned to for indicating that the set paging mode command has been executed. For sequential bit SEQ 94 active at logic step 196, the received block count is set at 197 into section B COUNT 102 of PPARMs 81. When the sequential bit is active, set paging mode command has a byte of modifier data indicating the number of blocks to be transferred in the current chain of commands. At 198, block count is checked—if it is zero, an error has occurred, i.e., it is improper for host 11 to indicate a transfer of zero blocks. If it is non-zero, ACE 50P is returned to for reporting the successful completion of the set paging mode command.

Not only does ACE 50P decode commands, but CAC 61P must also decode those commands relating to paging operations. FIG. 8 illustrates the logic associated with such decoding. Entry is from ACE 50P. During a chained reselection for a paging mode logical address, the module will decode the command found in register 130 (FIG. 4) and initiate appropriate action. Error conditions are also reported. Several internal registers (IR) are used during execution of this module, but these IRs are not shown for brevity in the drawing; the use of internal registers in microcode and other types of processor 31P functions is well known. Associated with the command in register 130 is the logical device address. For enhanced processing, selected portions of LDCB 62 are transferred to internal registers. Then at 200 the channel mask from section 91 of foundation portion 80 and the logical address in section 92 are transferred to internal registers. The command from register 130 is transferred to the internal register at 201. At 202, CCB 63 is accessed for comparing the logical address in 125 (FIG. 3) with the logical address received from register 130. If there is no change in addresses, then steps 203 and 204 are omitted. Otherwise, CCB 63 is initialized at 203 for transferring all of the current control data from channel adapters 32 and register 130 into CCB 63.

A new pointer to LDCB 62 is calculated at 204 as previously described and also transferred to CCB 63 section 126. At 205, the LDCB 62 SIO (start I/O) flag (not shown) is reset to zero. That is, we are now proceeding into command execution, and the SIO is no longer considered recent. At 206, CCR bit 95 of foundation portion 80 of LDCB 62 is examined. If it is zero, some nonpertinent steps are performed at 207; and then at 208 the received command in register 130 which was stored into the internal register at 201 is now stored in LDCB 62, section 93. Certain flags, such as SEQ 100, RO 101 and the like, are transferred to an internal register of processor 31P. Then the code module corresponding to the received command is activated at 209. That portion of the microcode, after completing the command, will return processor 31P to ACE 50P. These commands can include set sector, seek cylinders, read, write and the like; the code modules for such commands are known.

If at 206 a channel command retry (CCR) was indicated, then at 212 processor 31P checks to see if the received command from channel adapter 32 corresponds to the command stored in section 93 of LDCB 62. If they are equal, everything is all right and the CCR bit 95 is reset to zero at 214. Then steps 208 and 209 are performed. If the commands are not equal, an error condition is indicated at 213, and ACE 50P is returned to immediately for reporting the error status to host 11.

In a command execution, such as activated at step 209, one of the first things to be done is to search DIR 43 for allocated space in cache 40 corresponding to the requested paging block. FIG. 9 illustrates the logic steps which perform the control for both read and write data commands bearing a logical device address. DIR 43 is first searched; if the requested paging block is not in cache 40, a miss occurs. Then certain functions are performed. On the other hand, if the requested paging block is identified as being in cache 40, then a so-called hit occurs and other functions are performed. Read or write command execution will continue, as will become apparent. In detail, at 221, certain nonpertinent logic steps are performed with respect to error status. For example, if the received command is not a read or a write command, then it is inappropriate that a directory search be made, and an error condition must be indicated. At 222, a block identification (BID) is built from the device address D, cylinder address C, head address H and the record R. In the instant embodiment, there are four records per track, hence the record number is any one of four values. Building BID merely constitutes taking the address and putting it into a two-byte internal register. At 223, hash 44 is executed. The hash, which can be any hash operation, generates an address signal corresponding to the address displacement into SIT 45, which contains the directory 43 index. That pointer is then fetched at 224 from SIT 45. Then in loop 205, DIR 43 is scanned within a hash class. When SIT 45 is read at 224, an entry from DIR 43 constituting the first entry in a hash class is read from system storage 30 into internal register (not shown) of processor 31P. This frees system storage 30 for other operations in the event an interruption occurs. In any event, the directory search includes making ADEB 76 equal to the addressed directory entry at 227. This action includes reading the appropriate directory 43 entry and transferring the entry to ADEB 76. At 228 some nonpertinent logic steps are performed. At 229, the contents of BID are compared with address 108 contained in ADEB 76. If the two values are equal, then a hit occurs and logic path 230 is followed. If the two values are not equal, then the searching has to continue. Link 109 is set to an appropriate internal register at 231. Then at 226, the link is examined to see if it is the end of the hash chain (EOC). If the entry is the only entry, then a miss has occurred and a return code RC representing miss is set at 233. Otherwise, the scan will continue repeating steps 227 and 229 looking for a hit by transferring successive directory 43 entries into ADEB 76.

When a hit occurs, processor 31P at 240 compares the CCL of section 108 of ADEB 76 with the cylinder value C for inequality. If there is no record in cache 40 corresponding to the desired record, the return code RC is set to no record at 241. For equality between CCL and C, a record found, or hit, is indicated at 242; and at 243 an internal register is set equal to the INDEX 107 of ADEB 76 (FIG. 3). Logic path 234 is followed to perform some nonpertinent error-related functions at 250; then at 251, whether or not a miss is indicated is examined. If a miss was not indicated (hit), then at 254 whether or not a record was found is examined, i.e., the return code of no record at 241 or a record found at 242. For no record, an error is indicated at 255, and processor 31P returns to ACE 50P for reporting the error condition. Otherwise a record was found, and the execution of the read command for transferring data from cache 40 to host 11 or in the reverse direction is performed as described later with respect to FIG. 10. On the other hand, for a miss condition at 251, processor 31P at 252 accesses LDCB 62 for the addressed logical device and sets the miss bit 96 to unity in the foundation portion 80 (FIG. 3). Then at 253, processor 31P proceeds to prepare cache 40 for command execution as explained later with respect to FIG. 11.

For a cache 40 hit, for either a read or write command, the logic steps of FIG. 10 show processor 31P following logic path 256 to perform some error detection and indicating related nonpertinent logic steps at 260. At 261, the mode of read or write is examined. This is done by examining the command code permutation in section 93 of foundation portion 80 of LDCB 62. For a read command, logic path 262 is followed while for a write command, logic path 263 is followed.

For a read command hit, data is transferred from cache 40 to host 11. At 270 the transfer actually takes place by transferring data from cache 40 over bus 41 (FIG. 1) to channel adapters 32 for relaying to host 11. Upon completion of that data transfer, which can be achieved by an automatic data transfer circuit (not shown) of known design and widely practiced in the data processing art, control of peripheral system 10 returns to operate with respect to the present command. It should be appreciated that control functions during cache miss processing may be interleaved with data transfer functions in the various channel adapters 32. In any event, at 271 processor 31P examines LDCB 62 bit RO 101. If RO is equal to zero, then there is no discard after read. The block identification (BID) is then set in a so-called least recently used list as the most recently used (MRU) cache segment at 272. Since MLRU lists are well known they are not described. Then processor 31P returns to ACE 50P for reporting the completion of the read command executed at 270. If RO 101 is equal to unity at 271, then processor 31P at 273 examines ADEB 76 bit M 269 to determine if the identified paging block in cache 40 is modified. M bit 269 is set whenever a write command is executed against cache 40 for a given record. If the directory indicates there was no modification of the paging block stored in cache 40, the area of cache 40 storing a paging block is set free at 274, and the contents of ADEB 76 are erased as well as the corresponding entry in directory 43. This action effectively erases the paging block from cache 40. Certain error conditions are checked as indicated by logic path 275. Processor 31P continues to perform nonpertinent logic steps at 276.

Before a cache 40 portion storing a modified paging block can be set free, that paging block must be moved from cache 40 to the corresponding device 16-18. In one version of practicing the present invention, such modified paging blocks were transferred to a device 16-18 immediately following the last command in the chain of commands, and before the chain was indicated as being completed. Included in the nonpertinent logic steps, 276 is listing the paging block for possible transfer to the respective device 16-18 in a control block (not shown) used to direct destaging or demotion of data from the buffer to its backing store. Such mechanisms are well known and not described for that reason. Then at 277, processor 31P examines LDCB 62 SEQ 94 to see if sequential data is being processed. If not, only one block of paging data was sent to the host, and the completion of the command can be reported by ACE 50P; otherwise at logic step 278, processor 31P examines the block count indicated in section 102 of PPARMs 81 (FIG. 3). If the block count is not zero, then at 279 one is subtracted from the block count, and the completion of the command is reported through ACE 50P. Otherwise the block count is zero; then all of the sequential data has been transferred to host 11, and the completion of the command can be immediately indicated through ACE 50P.

For a write command, from logic path 263, processor 31P first performs some nonpertinent functions at 289. Such nonpertinent functions include setting up an automatic data transfer circuit (not shown) for transferring data from host 11 through the appropriate channel adapter 32, thence to cache 40 via bus 41. This transfer actually occurs at 290. During data transfers, processor 31P can operate with other channel adapters 32 in the control function area. Also at the same time, a direct access to a device 16-18 can occur, including a transfer of data signals. That is, channel adapter CAA can be transferring signals between cache 40 and host 11 through I/O connection 12 simultaneously with channel adapter CAD transferring data signals between host 11 input/output connection 15 and a device 16-18. Such overlap adds to the performance of peripheral system 10. Following the data transfer, processor 31P performs error-related functions at 291. Then at 292, if the block identification of the just transferred data signals is active, it means the block is not pinned to cache, i.e., may be replaced. If so, at 293, M bit 269 is set to unity; then at 294, the block identification is made most recently used in the MLRU list (not shown). Then at 295, nonpertinent functions are performed. Finally, for reporting status on the write command, control of processor 31P returns to ACE 50P.

For a directory miss in FIG. 9, processor 31P follows logic path 253 to the steps in FIG. 11. At step 300 processor 31P examines whether the command is a read or write. For a read command the read request is queued at 301, as described later with respect to FIG. 12 and as shown in FIG. 3. Then at 302, certain nonpertinent functions are performed, and a channel command retry CCR is sent to host 11 via ACE 50P. The CCR asks the host 11 to resend the command after a so-called DEVICE END is sent by peripheral system 10 which indicates that the data is now in cache 40.

For a write command at step 300, processor 31P goes to step 303 for allocating a cache block for the upcoming write command. An error condition can be found with an error reported via logic path 304. At step 305 a new entry is added to directory 43 using the format set up as shown for ADEB 76 in FIG. 3. Then the actual data transfer occurs at 306 as the signals from host 11 are transferred to cache 40 over bus 41 via channel adapters 32. Then at 307 in FIG. 11 steps 291-295 of FIG. 10 are executed.

Figure 12:
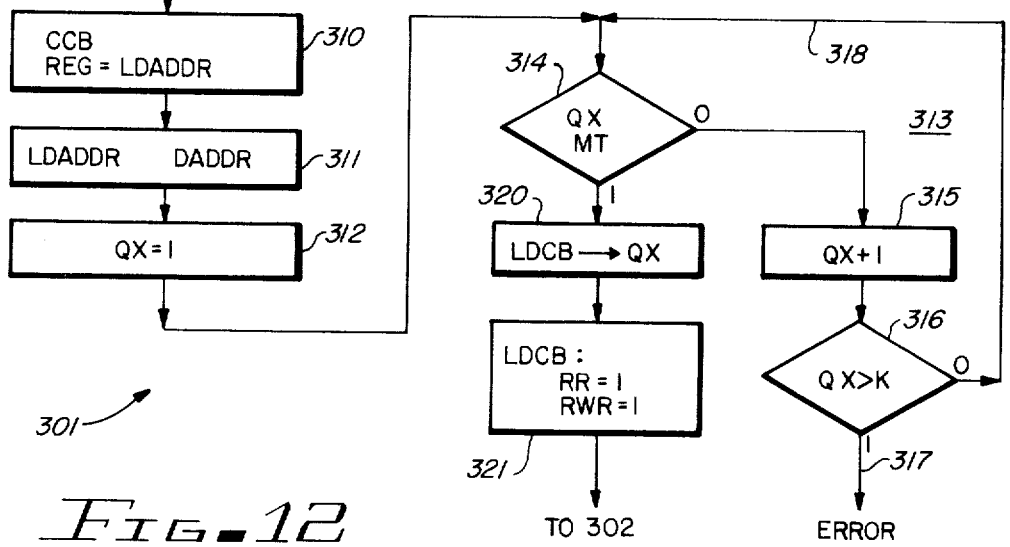
FIG. 12 illustrates a logic flow portion of the FIG. 1 cache access control relating to queuing read requests to a backing store when the requested data is not in the cache.

The read queues are built as shown in FIG. 12 wherein processor 31P at 310 accesses CCB 63 to make an internal register equal to the contents of LDADDR 125. At 311 the LDADDR is converted to a physical device address DADDR by deleting the AC portion. At 312 the read queue corresponding to the device (QX) is equal to unity, i.e., the portion 86 (FIG. 3) corresponding to the logical device is set to unity. This single bit is then translated into LDCB 62 addresses because the base address of the LDCB is known, with the offset being the logical address; since the position of the portion in LDCB 62 is the logical address, the LDCB offset is also known. Then at 314, processor 31P determines whether or not portion 87 (FIG. 3) is zero, i.e., there are no reads queued. If the portion 87 is empty, then at 320 the pointer for the read queue is set to the logical device, that is, 1, 2 or 3 depending upon which logical device is in LDADDR. At 321, LDCB 62 is accessed and read retry RR bit 122 and RWR 128 are set to unity. If there is a read queue entry in section 87, i.e., a read queue has already been inserted, then at 315 the queue pointer is indexed by 1. At 316 the queue pointer is checked again. If the pointer is less than 3, then processor 31P follows logic path 318 processor 31P to again examine the next position in portion 87 to determine if that one is empty. If it is not empty, then the cycle is repeated until either an empty queue location is found or an error condition is indicated at 317 showing a read queue request when the read queue is full (i.e., pointer is equal to 3).

While the invention has been particularly shown and described with reference to preferred embodiments thereof, changes in form and details may be made therein without departing from the spirit and scope of the invention.

What is claimed is:

1. The machine-implemented method of operating a storage system having a plurality of addressable backing signal storage devices, an addressable cache memory for selectively storing some replications of signals stored in the backing store devices in replication spaces in said cache, means for requesting ones of said stored signals;

the machine-implemented steps of:

addressing storage locations in each of said backing storage devices by a respective device address for accessing such backing storage device for conducting signal transfers therewith;

independently of said addressing of said backing storage devices, receiving a request for accessing data stored in a one of said backing storage devices, said received request having a request address which includes a one of said device addresses plus address modifier examining said address modifier for a plurality of first values and a second value;

when the address modifier of said received request has any one of said plurality of first values, accessing said storage locations via said cache memory using said device address by itself as received with said request, examining said cache memory for a given replication of data stored in said respective backing storage devices accessible by using said respective device address;

when said address modifier has said second value bypassing the cache memory for directly accessing the storage location in said respective backing storage device identified by the device address received with said received request;

when said examining of said cache memory shows no replications of said requested ones of said signals in said cache memory, then transferring such requested ones of said signals to said cache memory from said backing storage device having said device address; and selectively reserving for allowing only a given requestor access to said backing storage device via said received device address and received address modifier having said second value while simultaneously allowing requestors other than said given requestor to access said reserved device via said replications of said data of said reserved device when using said plurality of first values as address modifiers.

2. The machine-implemented method set forth in claim 1 further including the machine-implemented steps of:

setting a control block LDCB for each of said predetermined address modifiers having a one of said first values including storing identifications of the corresponding backing storage device address and cache memory location of the data replication stored in the cache memory such that each said predetermined address modifiers having one of said first values enables access by said storage system to a respective one of said control blocks whereby each of said request addresses having an address modifier with a first value logically appears as an independent logical device capable of being addressed independently of others of said predetermined request addresses with an address modifier having one of said first values and independently of said backing storage devices; and queuing accesses to each of said backing storage devices for all of said logical devices for each respective backing storage device in a separate FIFO queue store for each of said backing storage devices whereby data is transferred from each of said backing storage devices to said cache memory in an order of receipt of requests for data received via said request addresses for each of said backing storage devices.

3. The machine-implemented method set forth in claims 1 or 2 further including the machine-implemented steps of:

requesting to write data to a given one of said backing storage devices via a one of said request addresses with an address modifier having one of said first values;

examining said cache memory for allocated replication space for said write data;

receiving data to be written for an addressed one of said backing storage devices;

if said replication space is allocated, transferring said received write data to said cache memory;

if said replication space is not allocated, allocating a replication space and writing said received write data to said cache memory; and after storing said write data in said cache memory, writing said received write data directly to said backing storage devices from said cache memory whenever said request address identifies such backing storage device.

4. The machine-implemented method of operating a signal storage system having a plurality of addressable backing storage devices for storing information-bearing signals and an addressable cache for selectively storing replications of some but not all of said signals stored in any of said backing storage devices and means for selectively transferring signals between said cache and said backing storage devices, said cache and backing storage devices having means for receiving requests from a user for such signals stored therein;

the improvement including the machine-executable steps of:

assigning a unique device address to each storage location of said backing storage devices;

assigning a plurality of device address modifiers to each of said backing storage devices, each of said modifiers comprising a permuted set of digital signals with each permutation signifying separate and distinct address modifications for said each of said backing storage devices;

receiving requests from a user having a request address which includes said unique device addresses plus an address modifier;

examining said received modifier for determining whether such received modifier is a first one of said assigned modifiers or other than said first one of said assigned modifiers;

when said received modifier is a first one of said assigned modifiers, bypassing the cache for directly accessing and reserving said backing storage devices for requested signal transfers between users and such devices using said device addresses, respectively;

when said received modifier is other than said first one of said assigned modifiers, accessing a storage location of said backing storage devices via said cache for accessing said replications only using said unique device address, respectively;

upon each cache access for a given one of said replications which is not resident in cache, accessing one of said backing storage devices by using said unique device address by itself for transferring a given set of said stored signals from a respective one of said backing storage devices to said cache for storing such given replication therein as a data promotion, and then transferring said given replication to a said user identified by a respective received one of said other than said first one of said assigned address modifiers; and when said one of said backing storage devices is busy with another access, queuing said requests in order of receipt of said received requests.

5. A data-storage system having a plurality of addressable data-storage devices, a cache store for storing data at addressable locations which addressable locations are relatable to addressable data storage areas in said data-storage devices respectively, a control unit having a first connection to said data-storage devices and a second connection to said cache store and having adapter means for connecting said control unit to a using host unit which supplies device commands and addresses, data circuit means connected to said data-storage devices for transferring data signals to and from said data-storage devices and to said adapter for transferring data signals to and from said adapter;

the improvement including in combination:

address means in said control unit connected to said adapter means for receiving device addresses from said using host unit and including means for selecting a first address for each of said data-storage devices as a direct-access address and selecting any one of a plurality of additional addresses for each of said data-storage devices as a cache-access address, each of said addresses including a given address which uniquely identifies respective data-storage devices;

cache-access control means in said control unit connected to said address means to receive from said using host unit via said address means said additional addresses and being connected to said cache store for addressing said cache store in accordance with said received additional addresses;

means in said cache-access control for converting respective ones of said additional addresses to said given addresses for enabling access to said data-storage devices, respectively;

direct-access control means in said control unit and having a first input means connected to said address means for receiving from said using host unit via said address means said first addresses as a direct-access request and a second input means connected to said cache-access control means for receiving from said using host unit via said cache-access control means said given address included with said additional addresses to directly access said data-storage devices and being connected to said data circuit means for enabling data-signal transfers;

directory means in said cache-access control for responding to said given addresses received from said address means to generate access address signals for said cache store whereby said cache store is addressed by any one of a plurality of said additional addresses for a given unit of data of said respective data-storage devices;

search means in said cache access control coupled to said directory means for effectively searching said directory means to electrically indicate whether or not said cache store contains given data signals corresponding to data signals stored or storable at said given address;

read queue means of said cache-access control and coupled to said search means for being responsive to said search means indicating said cache store does not contain said given data signals to supply a request for said given data signals to said direct access control via said second input and storing an indication;

data-transfer means connected to said data circuit means to transfer data signals from said respective data-storage devices to said adapter means when said direct access control received said given address via said first input and to said cache store when said direct access control received said given address via said second input;

LDCB means in said control unit and connected to said cache-access control to indicate which of said additional addresses relates to each data transfer from said data storage devices to said cache store and connected to said address means for storing said received additional addresses for each of said received commands and device addresses such that the cache-access control can relate said read queue means to said received commands; and independent data bus means extending between said adapter means and said cache store such that data transfer may be concurrent between said host unit and said cache store and between said host unit and any one of said disk storage apparatus.

6. The system set forth in claim 5 further including, in combination:

inhibit means in said direct access storage control coupled to said address means for receiving a reserve one of said commands from said using host unit which indicates reservation of an addressed one by said received reserve command of said received reserve commands for selectively preventing access to a given one of said data storage devices via said first input while always permitting access via said second input.

7. Data processing apparatus including a host having a plurality of programs and connected to a paging storage system which includes a cache, backing storage coupled to said cache for enabling data transfers therebetween and having a plurality of independent data-storage devices, a cache bypass for enabling the host to directly access any one of said data-storage devices and a controller coupled to said cache and backing storage for operating same, the host being able to issue access requests stipulating use of the cache bypass or non-use of the cache bypass, characterized in that:

a common direct-access control connected to the host, the cache and the cache bypass and coupled to said data-storage devices for controlling transfer of first data between the host, data-storage devices, cache and cache bypass;

the cache bypass having a device reserve means for selectively allowing access to any one of said independent data-storage devices only by a given program of said connected host;

the connection from the cache to the common direct-access control being independent of said connection from the common direct-access control to said device reserve means; and the host having a set of address modifiers for each of said data-storage devices, and having means connected to said common direct-access control for selectively supplying said address modifiers to said common direct-access control, the common direct-access control being responsive to a supplied one of said address modifiers of each set for controlling the cache bypass to allow the host to access the addressed device directly using the cache bypass and for controlling the device reserve means to selectively allow access to the addressed device, and being responsive to other supplied ones of said address modifiers of each set for controlling the cache to allow the host to access said addressed device via the cache whereby access to said first data stored in any of said data-storage devices is reservable via said cache bypass to any one of said host programs and said first data is also always available to any of said host programs via said cache.

8. Apparatus as claimed in claim 7 in which the common control includes a cache-access controller to handle host demands for access via the cache and to handle cache demands to and responses from the backing storage, the cache-access controller having an independently addressable logical device control block for each of said other address modifiers in each of said sets presented thereto by the host for defining both the addressed device and the location (if any) in the cache of the copy of the data from that addressed device, so that each said host access request identified by a given one of said other address modifiers can be accommodated independently of any other cache-access request relating to the same addressed device and identified by another of said other address modifiers in the set of address modifiers for a given data storage device.

9. Apparatus as claimed in claim 8 in which the cache-access controller is arranged to queue cache-access requests by said address modifiers in the order in which the host-originated (but not satisfied) access requests were received by the cache-access controller.

10. Apparatus as claimed in claim 9 in which there are multiple peer connections between host and the paging storage system available for substantially concurrent use, the cache controller independently queuing read and write requests for access to backing storage.

11. The machine-implemented method of operating a data-storage system having a plurality of addressable backing data-storage devices, an addressable cache memory coupled to said backing data-storage devices for storing some replications of data stored in the backing data-storage devices in addressable replication data-storage spaces in the cache memory, means coupled to said backing data-storage devices and said cache memory capable of receiving from means outside the data-storage system requests for access to said backing data-storage devices with respect to data identified in each such request stored in such backing data-storage devices and possible replications of such identified data that is stored in said cache memory, each of said backing data-storage devices being addressable through said coupled means by any one of a first plurality of device addresses;

including the machine-executable steps of:

in response to said coupled means receiving a one of said system requests from said outside means for data stored in a given one of said backing data-storage devices via a first one of said first plurality of addresses usable for accessing said given one backing data-storage device, addressing said given one of said backing data-storage devices by said first one address for accessing same for performing data transfers between said addressed data-storage device and said outside means;

in response to said coupled means receiving a one of said system requests from said outside means for data stored in said given one of said backing data-storage devices via a second one of said first plurality of addresses usable for accessing said given one backing data-storage device, examining said cache memory for a replication of data corresponding to data stored in said given one of said backing data-storage devices identified in said received one of said system requests, when said examining shows a replication of the identified data in the cache memory, addressing said cache memory for accessing a predetermined replication area that is currently storing the replication of the identified data, then transferring data between said predetermined replication area and said outside means, when said examining shows no replication of data stored in the cache memory, for a request of data to be transferred from the given one backing data-storage device, first transferring the identified data from the given one backing data-storage device to the cache memory in a given predetermined replication area and then transferring the identified data from said given predetermined replication area to said outside means, for a request to transfer given data to said given one backing data storage device, transferring said given data from said outside means to said given predetermined replication area, then transferring said given data from said cache memory to the given one backing data-storage device; and selectively reserving access to a predetermined given backing data-storage device to a predetermined given requestor identifiable by said outside means and storing said identification in said coupling means whereby access to said predetermined given backing data-storage device is limited to said predetermined given requestor via said first one address, while said reservation of said predetermined given backing data-storage device is in force, allowing access to data stored in said reserved predetermined given backing data-storage device via the corresponding replication area for such data in said cache memory by using said given one of said backing data-storage devices second one addresses.

* * * * *